4 Sheets—Sheet 1.

A. STARK.
Grain-Binder.

No. 220,186. Patented Sept. 30, 1879.

Attest.
A. Scott
W. B. Groff

Inventor.
Andrew Stark
By R. S. & A. P. Lacey
attys

N. PETERS, PHOTO-LITHOGRAPHER, WASHINGTON, D.C.

A. STARK.
Grain-Binder.

No. 220,186. Patented Sept. 30, 1879.

4 Sheets—Sheet 3.

A. STARK.
Grain-Binder.

No. 220,186. Patented Sept. 30, 1879.

WITNESSES
P. B. Turpin
N. J. Osgood

INVENTOR
Andrew Stark
By R. S. & A. P. Lacey
ATTORNEYS

N. PETERS, PHOTO-LITHOGRAPHER, WASHINGTON, D. C.

A. STARK.
Grain-Binder.

No. 220,186. Patented Sept. 30, 1879.

Attest.
A. Scott
J. B. Goff

Inventor.
Andrew Stark
By R. S. & A. P. Lacey
attys

UNITED STATES PATENT OFFICE.

ANDREW STARK, OF TOPEKA, KANSAS.

IMPROVEMENT IN GRAIN-BINDERS.

Specification forming part of Letters Patent No. 220,186, dated September 30, 1879; application filed August 7, 1877.

*To all whom it may concern:*

Be it known that I, ANDREW STARK, of Topeka, in the county of Shawnee and State of Kansas, have invented certain new and useful Improvements in Grain-Binders; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

My invention relates to improvements in grain-binders, the nature of which will be fully explained by reference to the accompanying drawings, in which—

Figure 1:
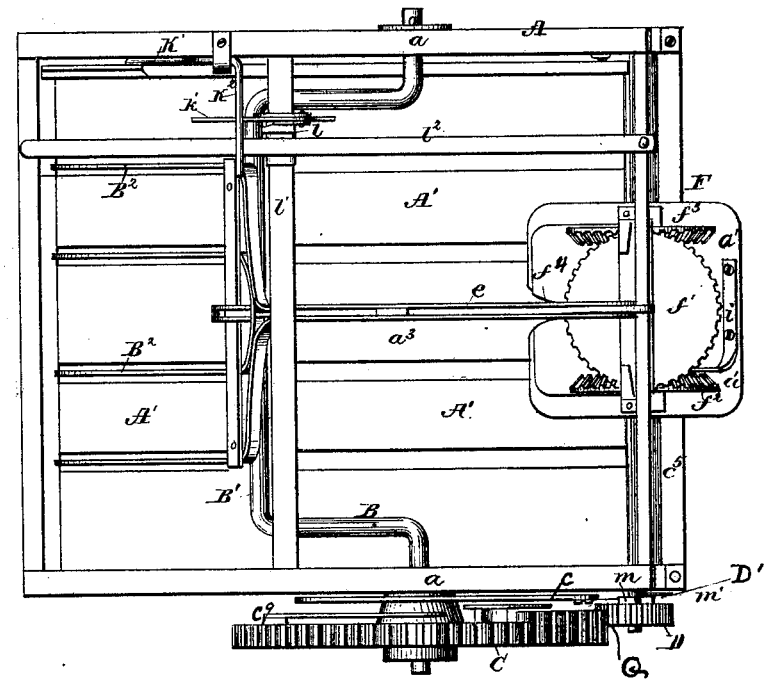
Figure 2:
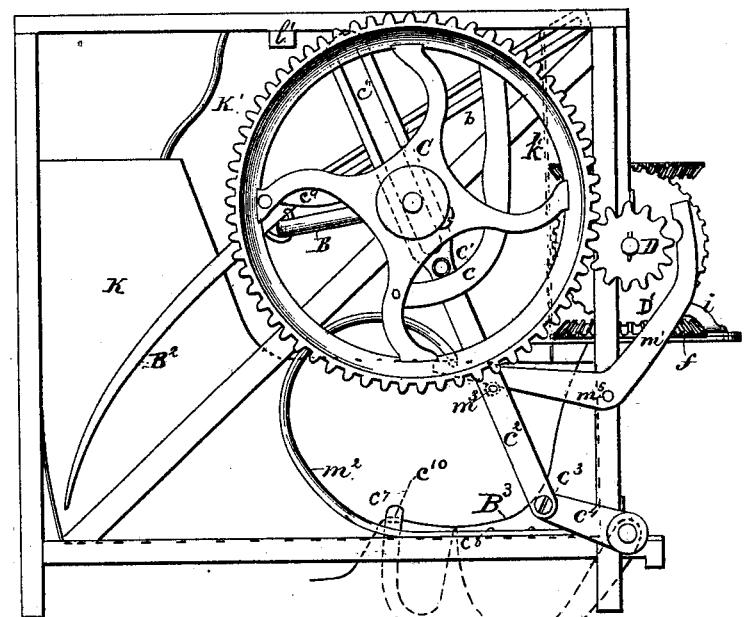
Figure 3:
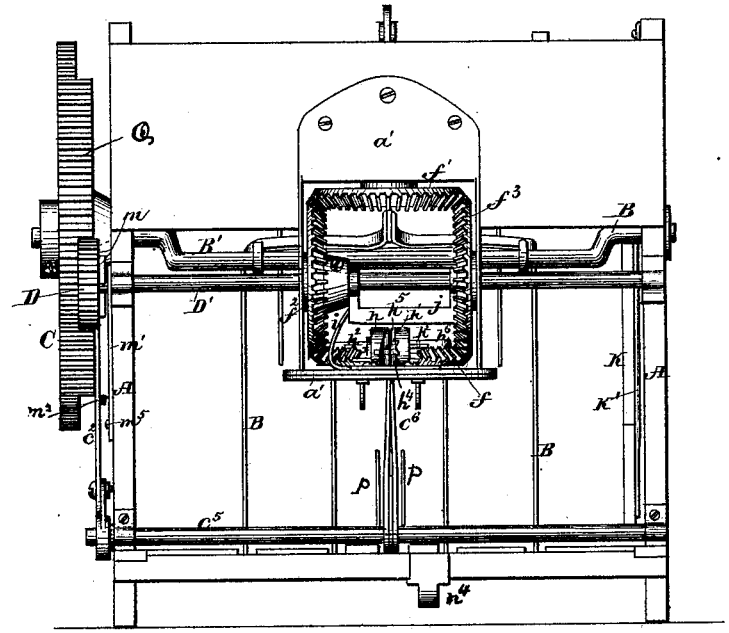
Figure 4:
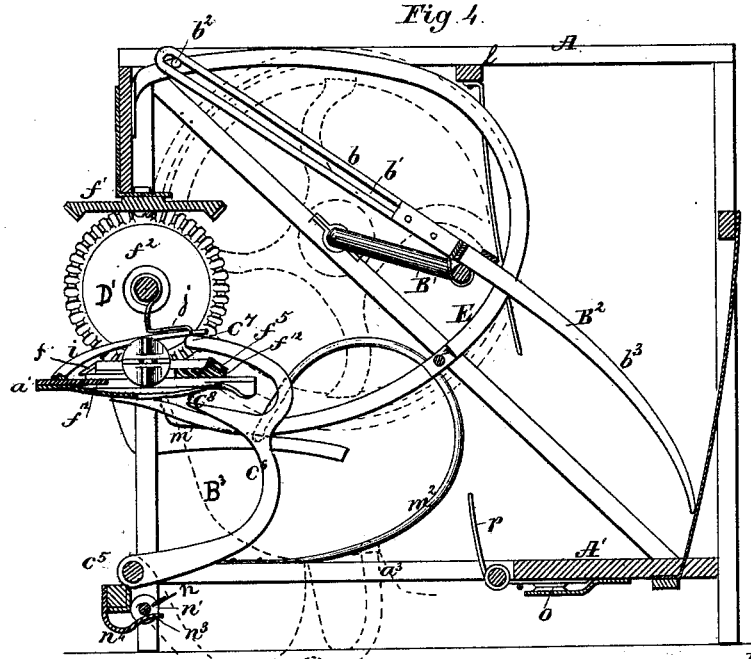
Figure 5:
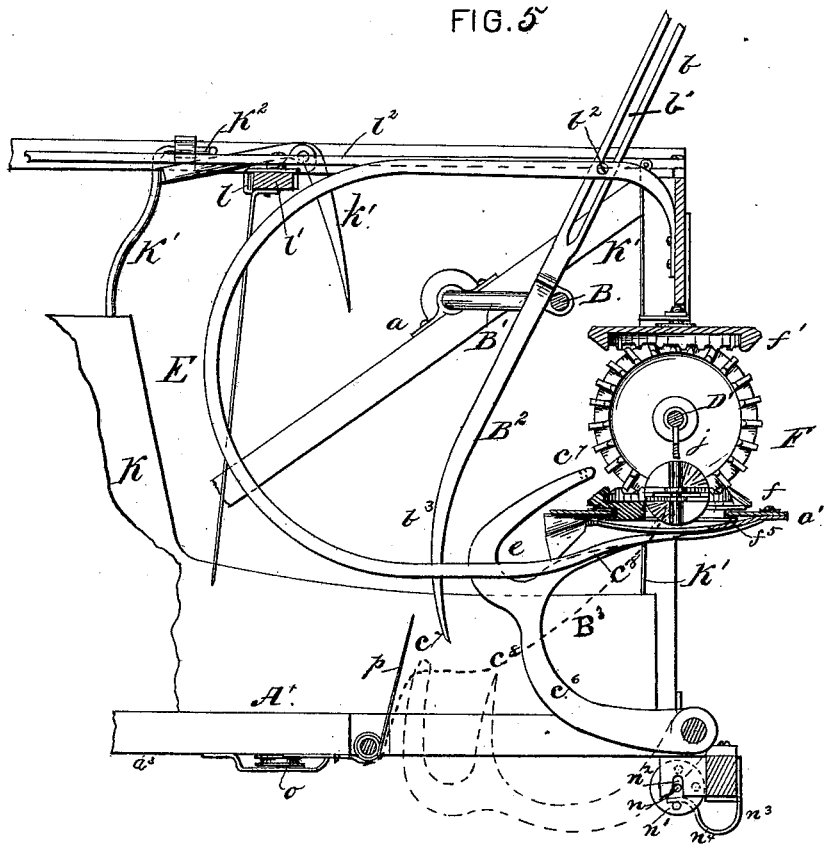
Figure 6:
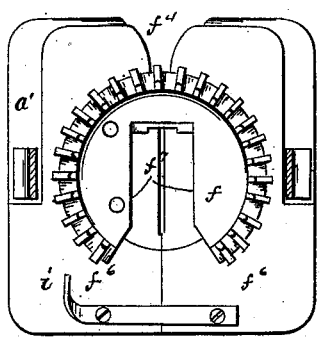
Figure 7:
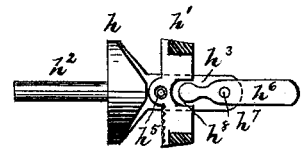
Figure 7:
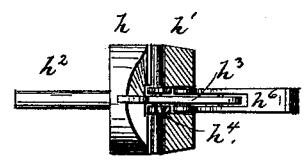
Figure 12:
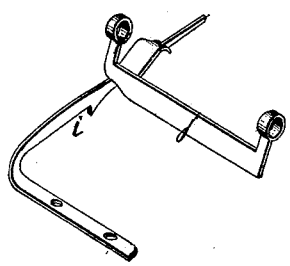
Figures 8, 11:
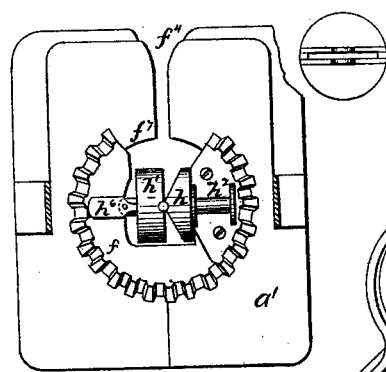
Figure 10:
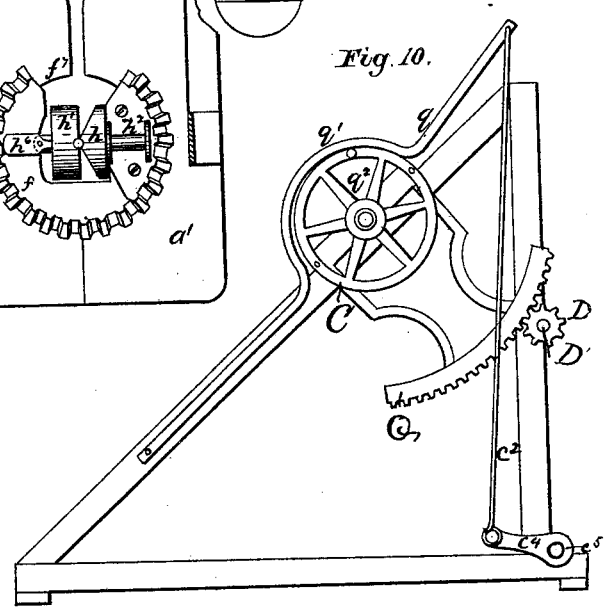

Figure 1 represents a plan; Fig. 2, a side view; Fig. 3, a front view. Figs. 4 and 5 are vertical longitudinal sections of the device, viewed from the opposite sides. Figs. 6, 7, 8, 9, 11, and 12 are detail views of parts thereof. Fig. 10 represents an end view of the apparatus, showing a slight modification of the driving means.

In each of the views similar letters of reference are employed to indicate corresponding parts wherever they occur.

A is the frame, to which are attached the various parts of my improved machine, and which is secured to the reaper in a manner well known to persons acquainted with grain-binders.

C is the main driving-gear, though which motion is received from the reaper and communicated to the mechanism of the binder, and it is supported on a shaft, B, which is bent into a crank, $B^1$, and journaled in bearings on opposite sides of the frame A, as shown.

The wheel C has formed on one side of it the segment Q, which engages with a pinion, D, on the shaft $D'$, which actuates the twisting and cutting mechanism.

$c$ is a cam-bar attached to the wheel C, and so arranged that it will, in the revolution of the wheel, pass under the pin $c^1$ and lift the sliding pitman $c^2$, which is formed with a guide-slot, $c^{11}$, placed over the shaft B, as shown.

$c^9$ is another cam-bar attached to the wheel C, and so arranged that it will strike the upper side of the pin $c^1$ as soon as the latter is released by the bar $c$, and force down the pitman.

The pitman $c^2$ is attached to a crank, $c^4$, on the shaft $c^5$, to which is fixed the binder-arm $c^6$, which gathers the grain into proper form and passes the band up to the tying mechanism.

$B^2$ is a fork or rake, journaled to the crank $B^1$ in line with the twisting mechanism. Its handle $b$ is formed with a slot, $b^1$, which slides on a pin, $b^2$, fixed between the bars of the curved presser E, hereinafter described.

The grain as received from the reaper is drawn by the fork over the end of the binder-arm and upon the band $B^3$. The fork is then lifted by the crank $B^1$, and is turned outward from the binding mechanism into a horizontal position, and carried to the front side of the binder and down through the grain, separating the latter, and gathering another quantity for the next gavel.

The binder-arm $c^6$ is semicircular in form, and is provided with the prongs or fingers $c^7$ $c^8$, arranged so that they pass one above and the other below the device for holding the end of the band.

The finger $c^7$ is provided with an eye or opening, $c^{10}$, through which the band passes, and the end of the finger $c^8$ is formed with a notch or recess in its end, so that it will hold the band in position.

The finger $c^7$ in the operation of the machine comes in contact with and moves a swinging lever, $j$, pivoted on the shaft $D^1$, and presses down a spring-pawl, $i$, for purposes hereinafter set forth.

E is a compressor and guard, formed, by preference, of two bars, between the upper ends of which the handle of the fork slides, and between the lower ends of which the upper or forked end of the binder-arm passes when carrying the band to the twister. It has its lower end secured to the under side of the platform $a^1$ of the binding mechanism, and extends backward, passing between the teeth of the fork, and is curved upward, and has its upper end secured to the frame in such manner that the crank $B^1$ revolves within it, as shown. This guard or compressor serves to prevent accidental entangling of straw with the crank $B^1$, clears the prongs of the fork $B^2$ as the latter is raised, and compresses and holds the grain from being forced upward out of position, so as to interfere with the fingers $c^7 c^8$ as the binder-arm $c^6$ carries the band around to the twister.

F is the twisting mechanism. It is composed of the segmental wheel $f$, with its parallel wheel $f^1$ supported one above the other, and formed with beveled edges, so that they will engage with the vertical bevel-wheels $f^2$ $f^3$, carried by the shaft $D^1$, the wheel $f^2$ being keyed to the shaft, while the wheel $f^3$ revolves thereon.

The wheels $f^1 f^2 f^3$ are arranged so as to give a regular movement to the segmental wheel $f$.

The segmental wheel $f$ supports the cutting and clamping devices, and, with the latter, performs the complex operation of twisting or tying, cutting, and holding the band. It is formed, as shown, with about one-fourth of its circumference cut away, and with the recess $f^7$ extending along its diameter and past its center, as shown.

The segmental wheel $f$ is not mounted on a shaft, but is provided with a projection on its under side around the opening or recess $f^7$, in which is formed a groove, $f^5$, which receives the semicircular projections or bearings $f^{12}$ on the supporting-platform $a^1$, which is formed with a slot, $f^4$, through which the band is carried by the fingers $c^7 c^8$ of the binder-arm to the twister.

The clamping and cutting device is composed of the fixed bevel-jaw $h$ and swinging jaw $h^1$, provided with knives or shears $h^4$ and the swinging lever $h^6$, all arranged on the shaft $h^2$, turning in bearings $k$, fixed on the upper surface and within the circumference of the beveled edge of the segmental wheel $f$, and so that the jaws revolve in the opening $f^7$ in the center of said wheel.

The clamp-jaws $h$ $h^1$ and shear-edges are held in place by a rivet, $h^5$, passing through the shaft $h^2$ in such a manner as to cause the shear-edges to work with a shearing motion upon each other, and immediately upon such motion being effected the clamp-jaws $h$ $h^1$ engage above the shears and hold the end of the wire or binding material firmly, but allowing the end of the wire or binding means below the shears to pass out freely.

Motion is obtained to the combined shear and clamp $h^1$ by means of a short lever, $h^6$, pivoted at its fulcrum $h^7$ to the shaft $h^2$ and working at one end alternately against the sides of a slot, $h^8$, in the clamp $h^1$. The outer extremity of the lever $h^6$ being free is thrown over at the desired times by means of the spring-pawl $i$, attached at one end to the frame $a^1$, and operated so that it may engage with the lever $h^6$ by means of the overhanging lever $j$, which is suspended loosely from the shaft $D'$, so that it may be brought down by the increased pressure caused by the end of the binder-arm $c^6$ when additional motion is communicated to the binder-arm $c^6$ by the cam or operating surface $c$ on the wheel C.

The cutting and holding device is attached to the segmental wheel $f$ in such manner that it is capable of revolving in its own bearings $k$ freely, and when it has clasped the wire or other binding material, as the binder-arm $c^6$ is drawn backward, the tension of the wire or binding material causes the cutter and holder to revolve one-half-way round, thereby causing the binding material to be suspended through and under the segmental wheel $f$, and the opposite side of shears and clamping-jaws is presented to and receives the middle of the wire or binding material.

K is the butt-evener or wind-board, suspended by rods $K^1$ to the frame A, as shown, and when at rest it occupies a vertical and fixed position against the lower portions of the side bars or posts of the frame A next the grain-platform. From its fixed point or position against the side framing it is thrown inward toward the binding-arm $c^6$, and it may be adjusted at the pleasure of the driver to any length of stroke, as hereinafter described, so as to adapt it to any length of grain; or it may be thrown out of gear when it is desired not to have it work.

Motion is communicated to the board K by means of a lever, $k'$, bent at right angles and hinged to a sliding bearing, $l$, working on a cross-piece, $l^1$. The lever $k'$ has motion communicated by the crank-shaft $B^1$ coming in contact with its lower end at each revolution, which motion is communicated to the board K by means of the projecting lever $K^2$ attached to the top of one of the rods $K^1$. After motion has been communicated to the board K by the crank $B^1$ and intervening mechanism, the board by its own gravity will fall into its normal position.

The amount of motion communicated to the board K may be regulated at will by shifting the position of the sliding bearing $l$ by means of the lever $l^2$.

The butt-evener K is thrown out of gear by moving the bearing $l$ outward against or near to the frame A, so that the crank B will revolve clear of the bell-crank lever $k$, as will be clearly understood by reference to Fig. 1.

Figure 9:
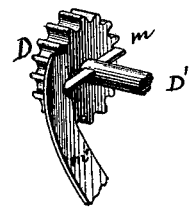

In order that the segmental wheel $f$ may always present the opening $f^7$ to the wire as the latter, held by the points $c^7 c^n$, is thrown up by the binder-arm $c^6$, a cross-bar, $m$, Fig. 9, is arranged on the rear of the pinion D, extending out at right angles to the shaft $D'$ and revolving with it. Against this cross-bar $m$ a lever, $m^1$, is pressed and firmly holds the cross-piece $m$ whenever the pinion D and shaft $D'$ are not in motion.

The lever $m^1$ is held against the cross-piece $m$ by means of a spring, $m^2$, and is automatically disengaged when the driving-pinions $f^2$ $f^3$ are engaged with the segmental wheel $f$, by means of a stop or pin, $m^3$, on the connecting-rod $c^2$ striking against the end of the lever $m^1$ and throwing it back. The lever $m^1$ is attached to the main framing by means of a suitable pivot or bearing, $m^5$.

Under the rear cross-bar of the apparatus, and below the shaft $c^5$, is arranged a shaft, $n$, upon which is supported a spool, $n^1$, for the binding or tying material, which shaft $n$ rests in slotted bearings $n^2$, (shown in Fig. 5,) so as to revolve freely; and the spool $n^1$ and shaft $n$, when placed in position, are held firmly by means of a pad, $n^3$, resting upon the surface of the material, and held by means of a curved spring, $n^4$, the pressure of the pad $n^3$ being regulated by the tension of the spring $n^4$, which is so made as to allow the pad $n^3$ to adjust itself automatically on the face of the spool $n^1$. The tension of the binding material is thus regulated to suit the requirements of the grain being bound.

Under the center board, $a^3$, of the platform A', and beyond the point of the binder-arm $c^6$ when down ready to receive the grain to be bound, a pulley or sheave, $o$, is arranged, around which the binding material passes. Between this pulley $o$ and the point of the binder-arm $c^6$ is arranged another pulley or roller, also attached to the center bar, $a^3$, under which the material is carried in its passage from the spool $n^1$ to the finger $c^7$.

Attached to the center bar of the framing, near each side of the finger $c^7$, are springs $p$, one end of each of which projects above the center bar of the framing perpendicularly, in such a manner that when the grain is forced back by the fork $B^2$ they will yield before it and fall on either side of the finger $c^7$, thereby allowing the grain to go freely back over the wire or binding material; but immediately the grain to form the bundle has passed the springs $p$ will rise behind the quantity of grain so pressed forward and completely separate the grain-supply from the bundle being formed, and also clear all grain from the fingers $c^7$ $c^8$.

My improved binder is so attached to the cutting-machine, whether reaper or harvester, that the machine will deposit the grain on the platform A', within reach of the fork $B^2$, as it is revolved. The spool $n^1$ is then placed in position under the rear cross-bar of the framing A and the spring $n^4$ adjusted.

If wire is employed, the end is carried forward under the middle of the machine to the covered sheave and passed around, the end being brought back and through the point of the finger $c^7$, and thence it is brought up and placed in the open side of the cutting and holding device F. The clamp-jaws $h$ $h^1$ are then thrown together by the lever. The wire is now drawn tight and the device revolved so as to present the open side to the inside of the machine. The lever $l^2$ is then thrown over until the swinging board will throw the grain over evenly, and so far as may be necessary to bring the band in the right place on the bundle.

The machine is now ready to make the bundle. The main wheel C is revolved from right to left. The fork $B^2$ is driven forward, the crank $B^1$ striking the lever $k'$, actuating the swinging wind-board K, and driving the grain endwise as the fork $B^2$ separates the bundle from the falling grain. The grain is carried back with the revolution of the shaft B and fork $B^2$ over the springs $p$ on the platform A' and the fingers $c^7$ $c^8$ of the binder-arm $c^6$, which now lie beneath the surface of the platform A'. The binding-wire is now drawn out through and over the finger $c^7$, and the springs $p$ rise and separate the loose grain from the bundle. The fork $B^2$, having reached the extent of its motion backward, passes the center, rises and moves forward again for the next bundle. Just before the fork $B^2$ gets clear back, the cam $c$ on the wheel C engages the friction-wheel $c^1$ on the connecting-rod $c^2$, and this rod is thereby drawn up, driving the binder-arm $c^6$ up behind the bundle, with the finger $c^7$ passing above and the finger $c^8$ below the disk $f$, whereby the wire is thrown to the center of the disk $f$. The segment Q on the rear of the main wheel C then causes the pinion D on the shaft D' to give the disks $f$ $f^1$ three full revolutions. Just before the revolution of the disks $f$ $f^1$ is completed a raised point or projection on the cam $c$ throws the binder-arm $c^6$ up still farther, causing the finger $c^7$ to strike against the hanging lever $j$, which presses on the spring-pawl $i$ until it engages with the lever $h^6$ operating the cutting and holding device. This being thrown back and the end of the wire caught, the bundle falls out behind the machine. The cam $c$ now draws the binder-arm $c^6$, with the band, back to its place, and the tension on the wire now, or when a bundle is again driven back by the fork $B^2$, causes clamping-jaws $h$ $h^1$, holding the end of the wire, to revolve halfway upon their own axis, when the operation is complete.

In Fig. 10, in place of employing a segment of teeth Q coincident with the continuous series of teeth on the periphery of the driving-wheel C, a segmental toothed rack, $Q^x$, is applied to the wheel C, the said rack $Q^x$ engaging at the desired times with the pinion D for the purpose of driving the shaft D' and operating the twisting and cutting devices. The connecting-rod $c^2$ in this case is connected to a lever, $q$, which at $q^1$ is formed with a cam-surface adapted to engage with a pin or stud, $q^2$, extending from the wheel C, and so arranged that at the proper time it shall cause the lever $q$ to operate the connecting-rod $c^2$, so as to actuate the lever $c^4$ and shaft $c^5$, and through them the binder-arm $c^6$.

What I claim, and desire to secure by Letters Patent, is—

1. The combination of the grain-platform A', revolving crank $B^1$, shaft B, fork $B^2$, compressor E, binder-arm $c^6$, fingers $c^7$ $c^8$, shaft $c^5$, arm $c^4$, connecting-rod $c^2$, and cam $c$, substantially as and for the purposes specified.

2. The combination, with the segmental wheel $f$ and the disk $f^1$, of the gears $f^2$ $f^3$, arranged and operating substantially as and for the purposes set forth.

3. The combination, with the centering or wind board K and crank $B^1$, of the bell-crank lever $k'$ and sliding bearing $l$, substantially as and for the purposes set forth.

4. The combination, with the segmental wheel $f$ and beveled wheels $f^1$ $f^2$ $f^3$, shaft $D'$, provided with a cross-piece, $m$, and pinion D, of the bell-crank lever $m^1$, pitman $c^2$, having pin $m^3$, cam-bar $c$ on wheel C, and spring $m^2$, for the purpose set forth.

5. The combination, with the segmental wheel $f$, of the jaws $h$ $h^1$, lever $h^6$, arranged on the shaft $h^2$, revolving in a bearing, $k$, constructed and operating substantially as and for the purpose set forth.

6. The combination, with the platform $a^1$, segmental wheel $f$, jaws $h$ $h^1$, and lever $h^6$, constructed and arranged as described, of the spring pawl $i$, and swinging lever $j$, supported on the shaft D, as set forth.

7. The presser and guard E, constructed as described, in combination with the binder-arm or needle $c^6$, fork $B^2$, and crank $B^1$, for the purposes set forth.

8. The combination, with the fixed jaw $h$, constructed with beveled faces, as described, and the pivoted jaw $h^1$, supported on the axis $h^2$, of the knives or shears $h^4$, arranged and operating substantially as set forth.

9. In a grain-binding machine, the reversible clamping and cutting device, consisting of the fixed and the swinging beveled jaws $h$ $h^1$, having a common axis of motion, $h^2$, journaled on the revolving disk, having its bearing fixed and stationary on the binder-frame, said clamping and cutting device being adapted to receive and hold, by one pair of its beveled jaws, the end of the binding-wire, while the latter, by its tension, will bring the open pair of beveled jaws into proper position to receive the other end of that portion of the wire which has been carried around and forms the band for the gavel, substantially as set forth.

10. A butt-evener or bundle-adjuster, K, vibrating automatically against the butts of the bundles, and under control of the driver, so as to be thrown out of gear at will, substantially as set forth.

11. An automatically-vibrating butt-evener or bundle-adjuster, under the control of the driver, to be adjusted and operated at will, in combination with a grain-receptacle and binder-arm, substantially as described.

In testimony that I claim the foregoing as my own I affix my signature in presence of two witnesses.

ANDREW STARK.

Witnesses:
SAMUEL HINDMAN,
JOHN G. SEARLE.